United States Patent [19]
Bando et al.

[11] Patent Number: 5,758,478
[45] Date of Patent: Jun. 2, 1998

[54] FRONT-MOUNT MOWER TRACTOR

[75] Inventors: Niro Bando; Teruo Shimamura; Hironori Tsuchihashi; Yoshikazu Togoshi; Yoshiyuki Esaki; Yoshihiro Kawahara, all of Sakai, Japan

[73] Assignee: Kubota Corporation, Japan

[21] Appl. No.: 705,482

[22] Filed: Aug. 29, 1996

[30] Foreign Application Priority Data

Aug. 31, 1995 [JP] Japan ............... 7-223990

[51] Int. Cl.$^6$ ............... A01D 34/64
[52] U.S. Cl. ............... 56/15.2; 56/15.7; 56/17.1; 56/DIG. 11; 56/DIG. 14
[58] Field of Search ............... 56/15.1, 15.2, 56/15.7, 15.8, 14.7, 228, 6, 7, 17.1, 17.2, DIG. 11, DIG. 14, DIG. 22

[56] References Cited

U.S. PATENT DOCUMENTS

| | | | |
|---|---|---|---|
| 4,829,754 | 5/1989 | Shimamura et al. | 56/6 X |
| 4,930,296 | 6/1990 | Takei | 56/11.3 |
| 4,934,130 | 6/1990 | Johansson et al. | 56/6 X |
| 5,199,521 | 4/1993 | Samejima | 180/68.1 |
| 5,481,857 | 1/1996 | Umemoto | 56/12.6 |

FOREIGN PATENT DOCUMENTS 7-46924  2/1995  Japan.

*Primary Examiner*—Terry Lee Melius
*Attorney, Agent, or Firm*—Webb Ziesenheim Bruening Logsdon Orkin & Hanson, P.C.

[57] ABSTRACT

A front-mount mower tractor including a front axle case, a driver's platform disposed above the front axle case and in a front region of the tractor, a platform support frame having one end thereof fixed to the front axle case and extending under the driver's platform longitudinally forwardly of the tractor, and a mower unit raising and lowering link mechanism. The mower unit raising and lowering link mechanism includes lift links pivotally connected to the front axle case for suspending a mower unit from free ends thereof, lift arms pivotally connected to the front axle case above the lift links, at least a portion of each lift arm extending along a side surface of the platform support frame, connecting links each pivotally connected at one end thereof to one of the lift arms, and at the other end to one of the lift links, at least a portion of each connecting link extending along a side surface of the platform support frame, and a cylinder for swinging the right and left lift arms.

7 Claims, 6 Drawing Sheets

FRONT-MOUNT MOWER TRACTOR

BACKGROUND OF THE INVENTION

1. Field of the Invention

This invention relates to a front-mount mower tractor having a mower unit suspended from a front position of a tractor body through a link mechanism, and a driver's section disposed in the front position of the tractor body.

2. Description of the Related Art

A conventional front-mount mower tractor has a mower unit raising and lowering link mechanism as disclosed in Japanese Patent Publication Kokai No. 7-46924 or U.S. Pat. No. 5,481,857. The link mechanism includes a pair of right and left lift links pivotably extending forwardly of the tractor from a front axle case disposed at a front end of a propelling transmission case forming part of a tractor body frame, with a mower unit suspended from free ends of the lift links, a pair of right and left lift arms pivotally connected to a driver's platform, a connecting link for interconnecting one of the lift arms and one of the lift links, and a connecting link for interconnecting the other lift arm and the other lift link. With this mower unit raising and lowering link mechanism, the pair of lift arms are pivotable by a lift cylinder, to cause pivotal movement of the lift links, thereby raising and lowering the mower unit. In this type of front-mount mower tractor, the driver's platform supports the lift arms. Thus, the driver's platform is subjected to the load of the mower unit and a force of the lift cylinder in addition to loads of a steering column and the driver. The driver's platform must have a sufficient strength to withstand such heavy loads, which results in a massive construction of the driver's platform.

SUMMARY OF THE INVENTION

An object of this invention is to provide an improved construction of the mower unit raising and lowering link mechanism to lessen the load acting on the driver's platform.

In order to fulfill the above object, a front-mount mower tractor according to this invention comprises a front axle case, a driver's platform disposed above the front axle case and in a front region of the tractor, a platform support frame having one end thereof fixed to the front axle case and extending under the driver's platform longitudinally forwardly of the tractor, and a mower unit raising and lowering link mechanism, wherein the mower unit raising and lowering link mechanism includes:

- a right lift link and a left lift link pivotally connected to the front axle case for suspending a mower unit from free ends thereof;
- a right lift arm pivotally connected to the front axle case above the right lift link, at least a portion of the right lift arm extending along a right side surface of the platform support frame;
- a left lift arm pivotally connected to the front axle case above the left lift link, at least a portion of the left lift arm extending along a left side surface of the platform support frame;
- a right connecting link pivotally connected at one end thereof to the right lift arm, and at the other end to the right lift link, at least a portion of the right connecting link extending along the right side surface of the platform support frame;
- a left connecting link pivotally connected at one end thereof to the left lift arm, and at the other end to the left lift link, at least a portion of the left connecting link extending along the left side surface of the platform support frame; and
- actuating means for swinging the right and left lift arms.

The above mower unit raising and lowering link mechanism has the following functions.

When the actuating means such as a hydraulic cylinder is operated, the right and left lift arms having a pivotal axis thereof supported by the front axle case cause, through the connecting links, the right and left lift links also having a pivotal axis thereof supported by the front axle case to pivot vertically to raise or lower the mower unit suspended from the free ends of the lift links. At this time, the platform support frame is free from the operating force of the actuating means and the load resulting from the weight of the mower unit per se. Consequently, the driver's platform itself may have a lightweight structure enough to bear the loads of a steering column and the driver.

Further, since the right and left lift links and connecting links extend along the opposite sides of the platform support frame, the platform support frame acts as a stopper for preventing sideways swing of the lift links and connecting links. This contributes to avoidance of extensive sideways wobbles of the mower unit. That is, since the lift arms are disposed at opposite sides of the platform support frame, the tractor may run without the mower unit wobbling sideways relative to the tractor body even when the pivotal connections of the lift links to the front axle case become worn and loose through use. Particularly when the tractor makes a turn, the lift links may swing sideways under the inertia and centrifugal force acting on the mower unit in a raised position. However, the connecting links contact the side surfaces of the platform support frame to act as a stopper to limit the swing of the lift links through the connecting links, thereby preventing extensive sideways wobbles of the mower unit.

In a preferred embodiment of the invention, springs are provided for applying a force to the right and left lift links in a direction to raise the mower unit, in order to diminish power required of the actuating means to raise the mower unit.

In a further preferred embodiment, the platform support frame includes a support arm extending transversely of the tractor for supporting the driver's platform, the support arm having upper stopper means for defining an upper limit of movement of the right and left lift links. In addition, a brake shaft is provided which extends through and is rotatably supported by the platform support frame for operating brakes, the brake shaft having lower stopper means for defining a lower limit of movement of the right and left lift arms. This construction realizes, in a simple way, upper and lower stoppers for limiting vertical movement of the mower unit raising and lowering link mechanism without requiring a special supporting device. These upper and lower stoppers also are operable without imparting any load to the driver's platform.

The platform support frame may include right and left angle elements, and a cross plate for interconnecting the angle elements. The cross plate may interconnect the angle elements in forward regions thereof, the angle elements having free end regions thereof connected to opposite side surfaces of the front axle case so as to sandwich the front axle case therebetween. The above arrangement produces a square frame structure with the front axle case forming one side thereof, which gives high rigidity to the platform support frame. A steering column attached to the highly rigid cross plate has a high degree of stability.

Other features and advantages of this invention will be apparent from the following description of the preferred embodiment to be had with reference to the drawings.

DESCRIPTION OF THE PREFERRED EMBODIMENT

Figure 1:
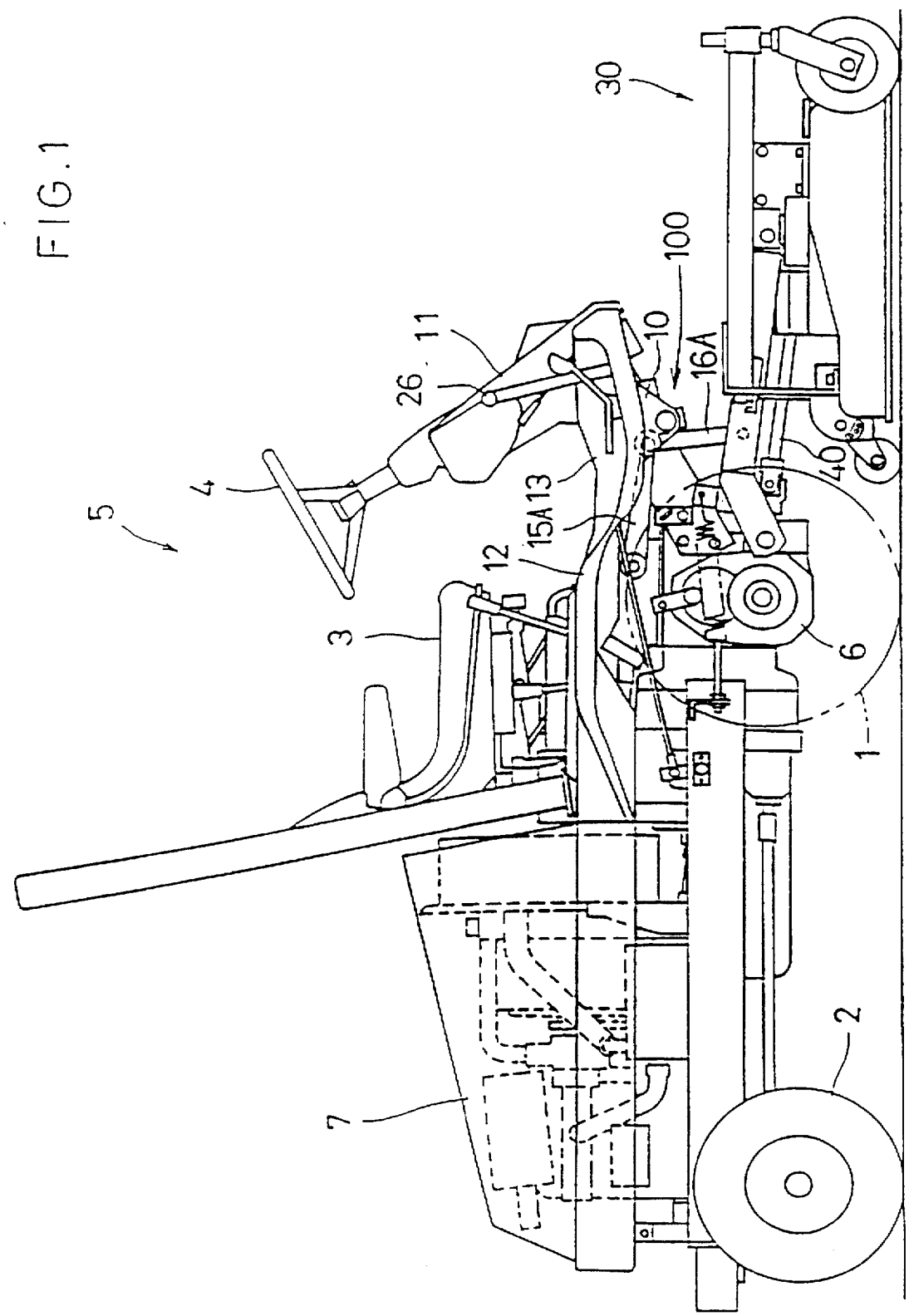
FIG. 1 is a side elevation of a front-mount mower tractor.

FIG. 1 shows a front-mount mower tractor having a pair of right and left drivable front wheels 1, and a pair of right and left drivable and dirigible rear wheels 2. A driver's section 5 is disposed in a forward position of a tractor body, and includes a driver's seat 3 and a steering wheel 4. A front wheel transmission case 6 is disposed below the driver's section 5, which forms a front portion of a body frame. A motor section 7 is disposed in a rearward position of the tractor body, and includes an engine for driving the front and rear wheels 1 and 2. A mower unit 30 is vertically movably suspended through a mower unit raising and lowering link mechanism 100. The mower unit 30 receives drive from the motor section 7 through a rotary shaft 50.

Figure 2:
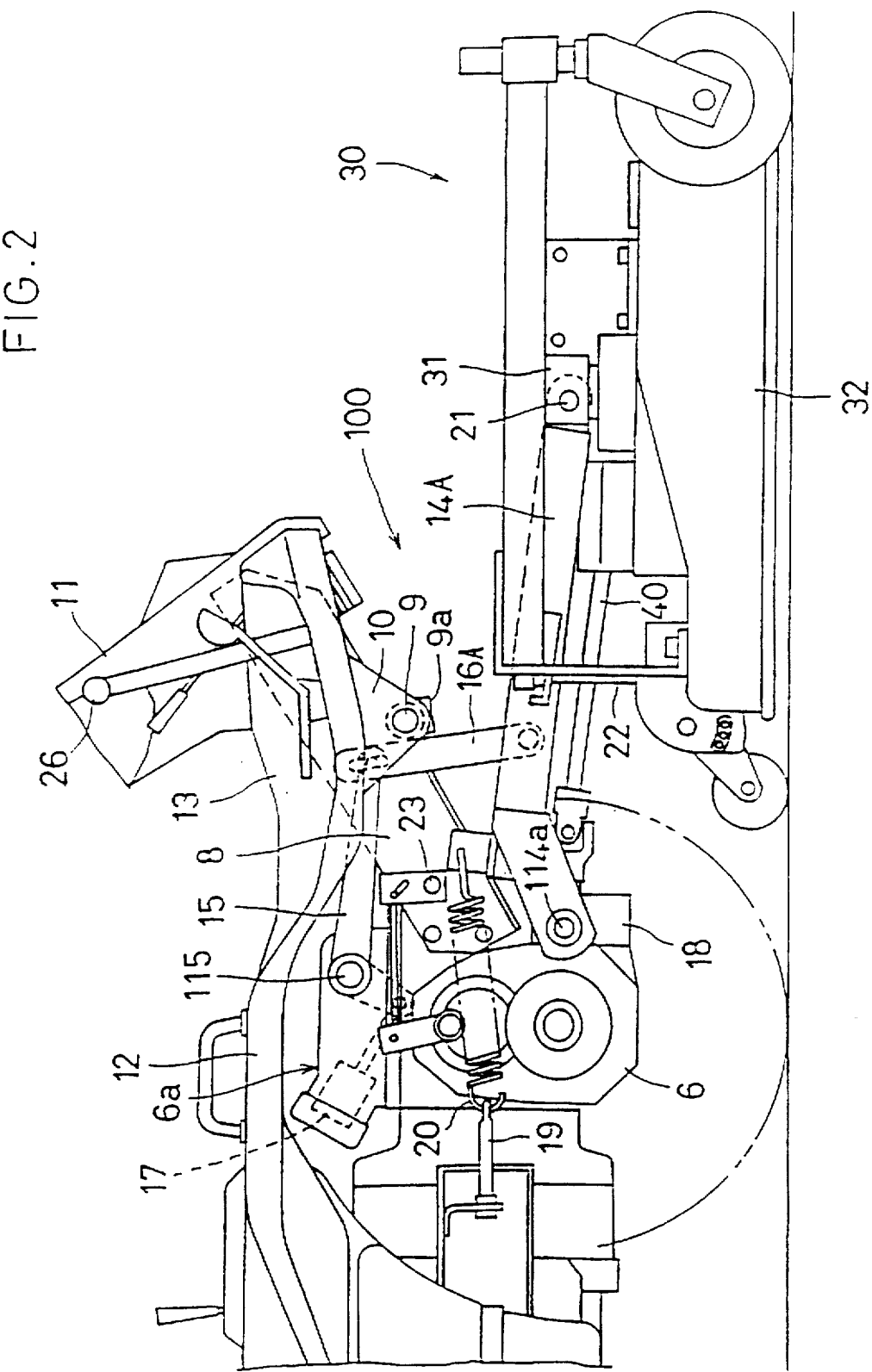
FIG. 2 is a side view of a mower unit raising and lowering link mechanism.
Figure 3:
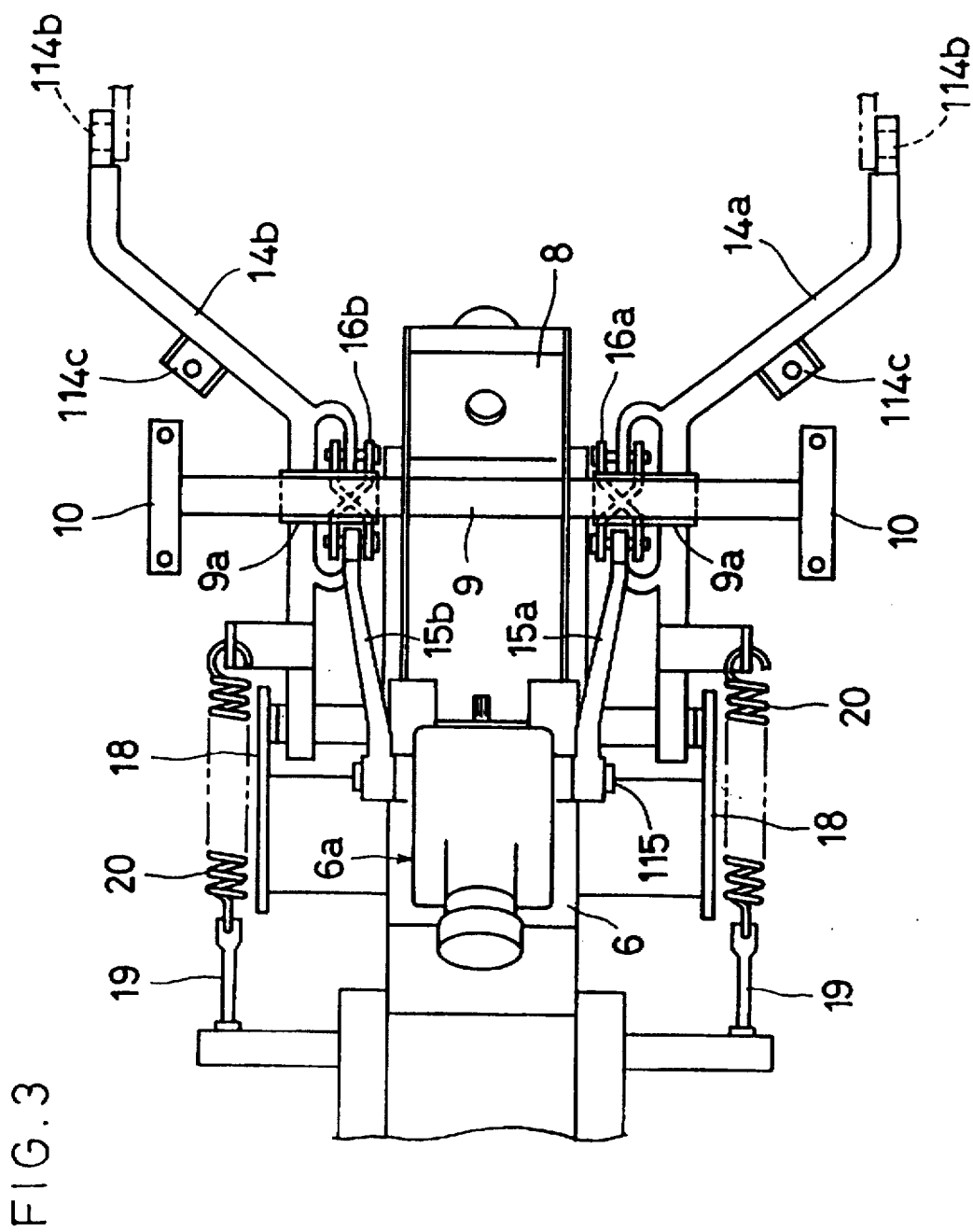
FIG. 3 is a plan view of the mower unit raising and lowering link mechanism.
Figure 4:
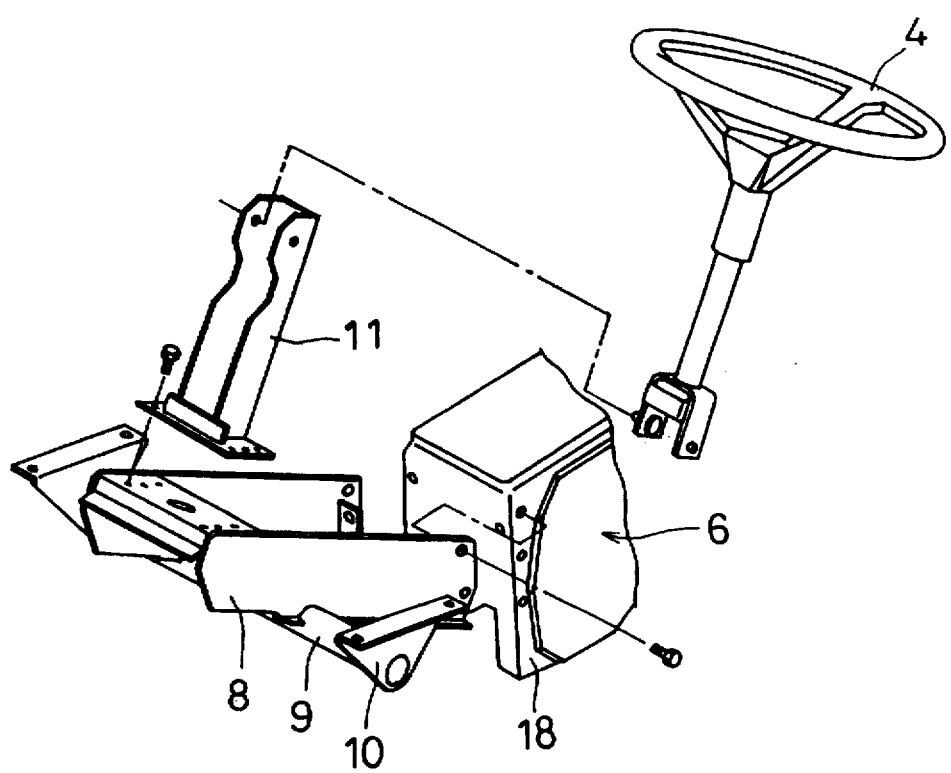
FIG. 4 is a perspective view of a lift link stopper.

Referring to FIGS. 2 through 4, a platform support frame 8 extends forwardly and upwardly from a vertically intermediate position at a front end of the front wheel transmission case 6. The platform support frame 8 supports, in an intermediate position longitudinally of the tractor body, a support arm 9 formed of a round pipe extending transversely of the tractor body and having step supports 10 attached to opposite ends thereof. Further, the platform support frame 8 supports, at a forward end thereof, a steering column 11 supporting the steering wheel 4, headlights, a control panel, a shift lever and so on. A plastic driver's platform 13 formed integral with front wheel fenders 12 is attached to the right and left step supports 10 and to a body frame (not shown) connected to a rear end of the front wheel transmission case 6. The driver's seat 3 is attached to an upper surface at the rear end of the front wheel transmission case 6. The above is the construction of the driver's section 5.

As shown in FIGS. 2 and 3, the link mechanism 100 for raising and lowering the mower unit 30 includes right and left lift links 14a and 14b, lift arms 15a and 15b and connecting links 16a and 16b distributed at opposite sides of the platform support frame 8, and a single lift cylinder 17 mounted in an upper end of the front wheel transmission case 6.

The right and left lift links 14a and 14b extend forwardly from link connectors formed of link connecting brackets 18 attached as part of the front wheel transmission case 6 to right and left sides of the front wheel transmission case 6 below where the platform support frame 8 is connected. The link connecting brackets 18 support proximal ends of the lift links 14a and 14b to be pivotable about an axis 114a extending transversely of the tractor body. A lift spring 20 extends between each of the proximal ends of the lift links 14a and 14b and a spring holder 19 extending from the tractor body. The right and left lift links 14a and 14b are vertically pivotable about the axis 114a and biased upward by the lift springs 20 relative to the front wheel transmission case 6. Each of the right and left lift links 14a and 14b has a pinhole 114b formed at a forward end thereof. This pinhole 114b is connected to one of right and left connecting brackets 31 of the mower unit 30 by a suspension pin 21 extending transversely of the tractor body. Each lift link 14a or 14b further includes a connecting bracket 114c disposed between the pinhole 114b and the proximal end thereof. This connecting bracket 114c is connected to a connector provided in a rear position of a blade case 32 of the mower unit 30 by a suspension pin 22 extending vertically of the tractor body. Thus, the right and left lift links 14a and 14b are vertically pivotable about the axis 114a and biased upward by the lift springs 20 relative to the tractor body, while suspending the mower unit 30 through the forward and rearward suspension pins 21 and 22.

The right and left lift arms 15a and 15b extend forwardly from a right side and a left side of a case portion 6a above where the platform support frame 8 is connected to the front wheel transmission case 6. This case portion 6a supports the right and left lift arms 15a and 15b to be pivotable together through a single support shaft 115 extending transversely of the tractor body. The lift arms 15a and 15b are distributed laterally of the platform support frame 8. Consequently, the right and left lift arms 15a and 15b are vertically pivotable about the axis of the support shaft 115 extending transversely of the tractor body, with forward ends of the lift arms 15a and 15b vertically movable along and adjacent opposite sides of the platform support frame 8.

The left connecting link 16b interconnects the left lift arm 15b and left lift link 14b to be vertically movable together in the same direction. The right connecting link 16a interconnects the right lift arm 15a and right lift link 14a to be vertically movable together in the same direction. In this embodiment, each of the connecting links 16a and 16b has a double plate structure.

The lift cylinder 17 is a single-acting hydraulic cylinder having a cylinder portion formed in and integral with the case portion 6a of the front wheel transmission case 6. The lift cylinder 17 uses, as a pressure medium, lubricating oil stored in the front wheel transmission case 6 for lubricating a transmission and a differential. The lift cylinder 17 has a piston rod connected to a lift arm controlling arm extending from integral with the support shaft 115 inside the case portion 6a. The lift cylinder 17 pushes this lift arm controlling arm in a direction to raise the lift arms 15a and 15b, and releases the arm to allow the lift arms 15a and 15b to descend under the weight of the mower unit 30.

Specifically, when the lift cylinder 17 is operated to a pressure applying position, the two lift arms 15a and 15b swing upward under the hydraulic pressure of the lift cylinder 17. Then, the right and left lift arms 15a and 15b raise the lift links 14a and 14b through the connecting links 16a and 16b. The lift links 14a and 14b in turn raise the mower unit 30. At this time, the lift springs 20 also apply a force to raise the mower unit 30. Therefore, the mower unit 30 is raised quickly even if the driving force of the lift cylinder 17 is small for the weight of the mower unit 30. When the lift cylinder 17 is operated to an oil draining position, the weight of the mower unit 30 causes the lift cylinder 17 to swing the lift arms 15a and 15b downward. The right and left lift arms 15a and 15b lower the lift links 14a and 14b through the connecting links 16a and 16b, thereby lowering the mower unit 30. During the raising and lowering operations, the lift arms 15a and 15b and lift links 14a and 14b are pivotable as supported by the front wheel transmission case 6. Consequently, the operating force of the lift cylinder 17 and the weight of the mower unit 30 are not applied to the platform support frame 8.

Figure 5:
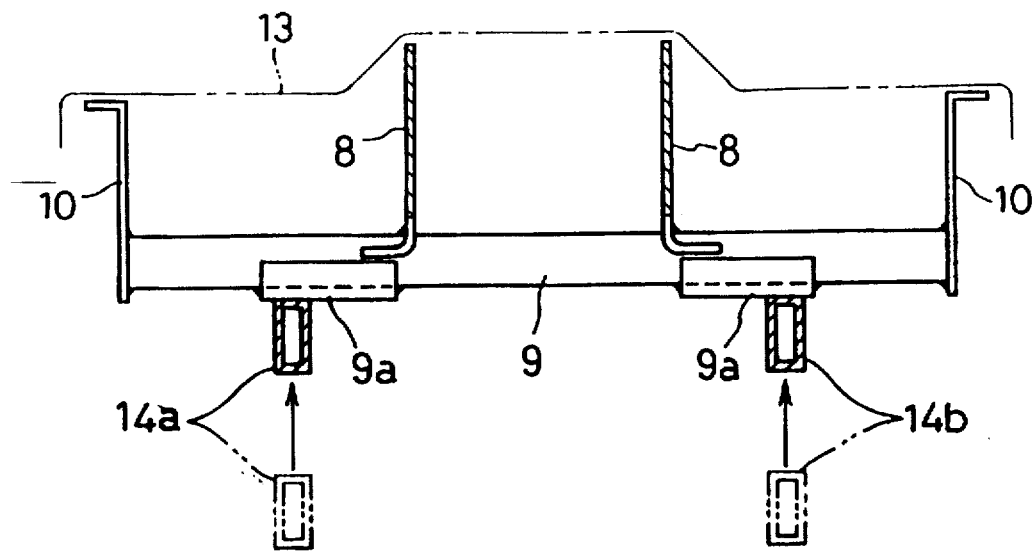
FIG. 5 is a front view of the lift link stopper.
Figure 6:
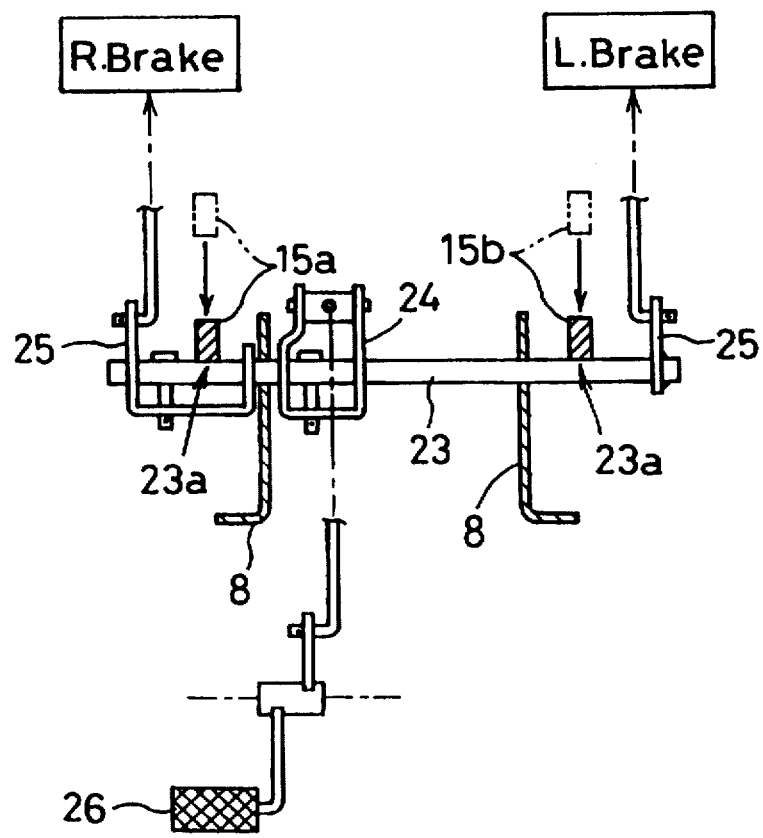
FIG. 6 is an explanatory view showing a function of the lift link stopper.
Figure 7:
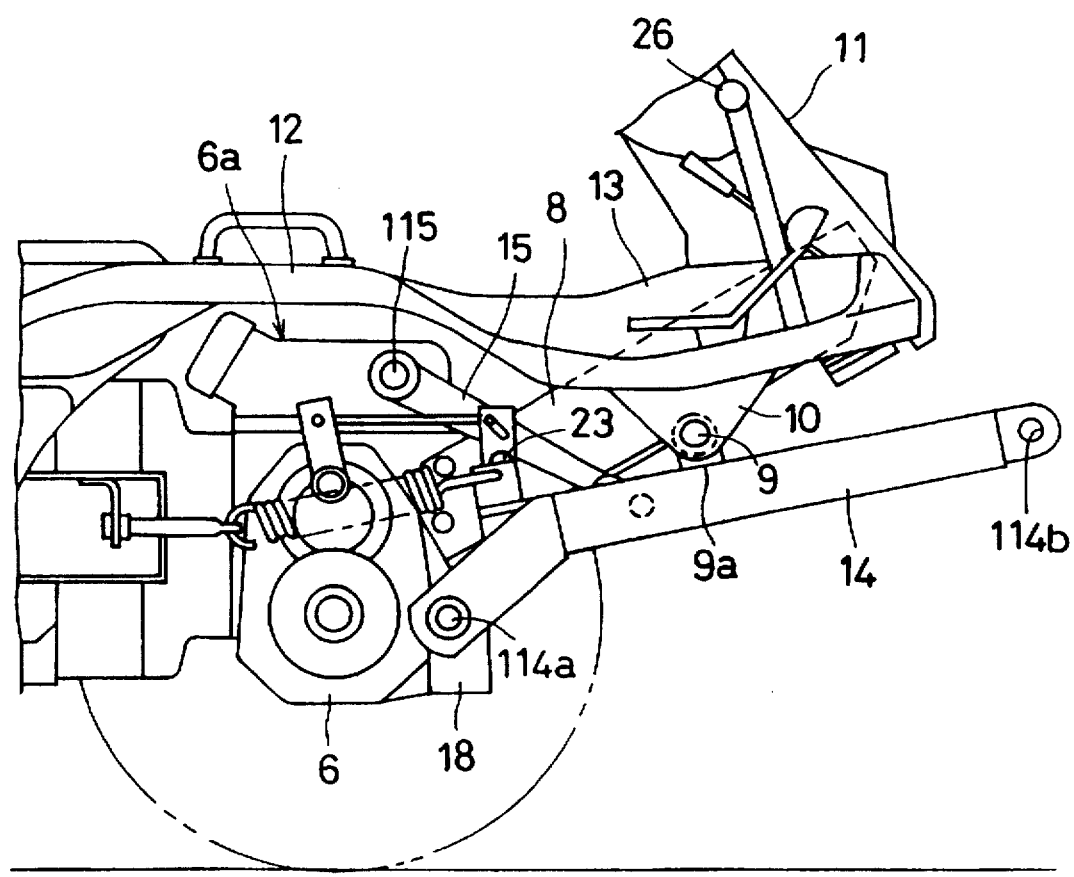
FIG. 7 is a side view showing how a platform support frame is attached to a front wheel transmission.

As shown in FIGS. 2 and 5, the support arm 9 includes stoppers 9a arranged outwardly of opposite sides the platform support frame 8 for acting on the lift links 14a and 14b. Specifically, when the lift links 14a and 14b are disconnected from the connecting links 16a and 16b, the lift links 14a and 14b are raised by the lift springs 20 to upper limits in contact with the stoppers 9a, respectively. As shown in FIG. 7, when the lift links 14a and 14b are disconnected from the connecting links 16a and 16b or the lift arms 15a and 15b are disconnected from the connecting links 16a and 16b, the lift arms 15a and 15b become disconnected from the lift links 14a and 14b. As shown in FIG. 6, when the lift arms 15a and 15b descend in the disconnected state, the lift arms 15a and 15b contact right and left shaft portions 23a of a single brake shaft 23 laterally outwardly of the platform support frame 8, respectively. This brake shaft 23 is supported by the platform support frame 8 in a position rearwardly of the support arm 9. Thus, these brake shaft portions 23a act as stoppers for defining a lower limit of movement of the right and left lift arms 15a and 15b, to prevent the lift arms 15a and 15b from contacting other components arranged therebelow. The brake arm 23 has a connecting arm 24 rigidly attached to an intermediate position thereof to be pivotable with rotation of the brake arm 23. The connecting arm 24 is interlocked to a brake pedal 26. The brake arm 23 further includes connecting arms 25 rigidly attached to opposite ends thereof to be pivotable with rotation of the brake arm 23. The connecting arms 25 are interlocked to right and left brakes mounted in the front wheel transmission case 6. Thus, an operating force of the brake pedal 26 is transmitted to the right and left brakes to slow down or stop the tractor.

When, for example, the tractor is driven with the mower unit 30 detached therefrom, and the lift links 14a and 14b and connecting links 16a and 16b disconnected from each other, the support arm 9 is used as a stopper to prevent vertical vibration of the lift links 14a and 14b. While the tractor is driven, the brake shaft 23 may also be used as a stopper to receive and support the lift arms 15a and 15b, thereby preventing the lift arms 15a and 15b from contacting the components arranged therebelow.

What is claimed is:

1. A front-mount mower tractor comprising:

a front axle case;

a driver's platform disposed above said front axle case and in a front region of said tractor;

a platform support frame having one end thereof fixed to said front axle case and extending under said driver's platform longitudinally forwardly of said tractor;

a right lift link and a left lift link pivotally connected to said front axle case for suspending a mower unit from free ends thereof;

a right lift arm pivotally connected to said front axle case above said right lift link, at least a portion of said right lift arm extending along a right side surface of said platform support frame;

a left lift arm pivotally connected to said front axle case above said left lift link, at least a portion of said left lift arm extending along a left side surface of said platform support frame;

a right connecting link pivotally connected at one end thereof to said right lift arm, and at the other end to said right lift link, at least a portion of said right connecting link extending along said right side surface of said platform support frame;

a left connecting link pivotally connected at one end thereof to said left lift arm, and at the other end to said left lift link, at least a portion of said left connecting link extending along said left side surface of said platform support frame; and actuating means coupled to said right and left lift arms for pivoting said right and left lift arms relative to said front axle case.

2. A front-mount mower tractor as defined in claim 1, further comprising spring means for applying a force to said right and left lift links in a direction to raise said mower unit.

3. A front-mount mower tractor as defined in claim 1, wherein said platform support frame includes a support arm extending transversely of said tractor for supporting said driver's platform, said support arm having upper stopper means for defining an upper limit of movement of said right and left lift links.

4. A front-mount mower tractor as defined in claim 1, further comprising a brake shaft extending through and rotatably supported by said platform support frame for operating brakes, said brake shaft having lower stopper means for defining a lower limit of movement of said right and left lift arms.

5. A front-mount mower tractor as defined in claim 1, wherein said platform support frame includes right and left angle elements, and a cross plate for interconnecting said angle elements.

6. A front-mount mower tractor as defined in claim 5, wherein said cross plate interconnects said angle elements in forward regions thereof, said angle elements having free end regions thereof connected to opposite side surfaces of said front axle case so as to sandwich said front axle case therebetween.

7. A front-mount mower tractor as defined in claim 6, wherein said cross plate supports a steering column.

* * * * *